United States Patent
Verón

(10) Patent No.: US 7,836,305 B2
(45) Date of Patent: Nov. 16, 2010

(54) METHOD OF AND SYSTEM FOR STORAGE OF I-WLAN TEMPORARY IDENTITIES

(75) Inventor: Christian Herrero Verón, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1211 days.

(21) Appl. No.: 11/080,918

(22) Filed: Mar. 15, 2005

(65) Prior Publication Data
US 2005/0250539 A1 Nov. 10, 2005

Related U.S. Application Data

(60) Provisional application No. 60/568,625, filed on May 6, 2004.

(51) Int. Cl.
H04L 29/06 (2006.01)
H04L 9/32 (2006.01)
H04M 1/66 (2006.01)
H04B 1/38 (2006.01)

(52) U.S. Cl. .................. 713/169; 713/150; 455/410

(58) Field of Classification Search .................. 713/150, 713/168, 170–171, 181; 380/225–257, 270, 380/273, 274, 277–279, 286; 455/410, 411, 455/419, 558, 412.1
See application file for complete search history.

(56) References Cited

U.S. PATENT DOCUMENTS

| | | | | |
|---|---|---|---|---|
| 6,167,137 | A * | 12/2000 | Marino et al. | 380/255 |
| 6,480,725 | B2 * | 11/2002 | Cassidy et al. | 455/558 |
| 6,591,098 | B1 * | 7/2003 | Shieh et al. | 455/419 |
| 6,934,391 | B1 * | 8/2005 | Linkola et al. | 380/247 |
| 2003/0074570 | A1 * | 4/2003 | Miyoshi | 713/190 |
| 2003/0105954 | A1 * | 6/2003 | Immonen et al. | 713/156 |
| 2003/0229597 | A1 * | 12/2003 | de Jong | 705/72 |
| 2003/0236928 | A1 * | 12/2003 | Wang et al. | 710/8 |
| 2004/0068653 | A1 * | 4/2004 | Fascenda | 713/168 |
| 2004/0193891 | A1 | 9/2004 | Ollila | |

FOREIGN PATENT DOCUMENTS

| | | |
|---|---|---|
| EP | 1 313 287 A | 5/2003 |
| WO | WO 03/001831 A | 1/2003 |
| WO | WO 2004/016010 A | 2/2004 |

* cited by examiner

Primary Examiner—Kimyen Vu
Assistant Examiner—Darren Schwartz

(57) ABSTRACT

A temporary-identity-storage method for user equipment includes receiving authentication challenge information and at least one temporary identity, processing the authentication challenge information, and determining whether the processing step results in successful authentication. The user equipment includes mobile equipment and a subscriber identity module. Responsive to a determination that the authentication was successful, the received at least one temporary identity is considered to be valid. If the received at least one temporary identity is at least one pseudonym and an appropriate data file to the store the at least one pseudonym is available in the subscriber identity module, the at least one pseudonym is stored and any previously-stored pseudonym is over-written in the subscriber identity module. If the received at least one temporary identity is at least one pseudonym and an appropriate data file to the store the at least one pseudonym is not available in the subscriber identity module, the at least one pseudonym is stored and any previously-stored pseudonym is over-written in the mobile equipment. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims. 37 CFR 1.72(b).

14 Claims, 2 Drawing Sheets

METHOD OF AND SYSTEM FOR STORAGE OF I-WLAN TEMPORARY IDENTITIES

CROSS-REFERENCE TO RELATED APPLICATIONS

This patent application claims priority from, and incorporates by reference the entire disclosure of, U.S. Provisional Patent Application No. 60/568,625, filed on May 6, 2004.

BACKGROUND OF THE INVENTION

1. Technical Field

The present invention relates generally to maintaining user identity privacy over a wireless local area network and, more particularly, but not by way of limitation, to maintaining privacy of user equipment communicating via Inter-working Wireless Local Area Network (I-WLAN).

2. History of Related Art

Inter-working Wireless Local Area Network (I-WLAN) is a feature of the Third Generation Partnership Project (3GPP) that allows a wireless LAN network to be interconnected with a 3GPP system. In I-WLAN, user identity privacy (i.e., user anonymity) is used to avoid sending any clear text permanent subscriber identification information (e.g., international mobile subscriber identifier (IMSI)) that could compromise the user's identity and location on a radio interface or allow different communications of the same user on the radio interface to be linked. User identity privacy is based on temporary identities (i.e., pseudonyms or re-authentication identities). The reception of temporary identity occurs at Extensible Authentication Protocol (EAP) authentication. For purposes of this patent application, a WLAN user equipment (WLAN UE) is user equipment capable of inter-working with WLAN.

The actions that a WLAN UE must perform upon receipt of temporary identity/identities due to user identity privacy are currently unspecified. Moreover, where the temporary identity/identities are to be stored (e.g, UMTS Subscriber Identity Module (USIM) or mobile equipment (ME)) has not been standardized.

SUMMARY OF THE INVENTION

A temporary-identity-storage method for user equipment includes receiving authentication challenge information and at least one temporary identity, processing the authentication challenge information, and determining whether the processing step results in successful authentication. The user equipment includes mobile equipment and a subscriber identity module. Responsive to a determination that the authentication was successful, the received at least one temporary identity is considered to be valid. If the received at least one temporary identity is at least one pseudonym and an appropriate data file to the store the at least one pseudonym is available in the subscriber identity module, the at least one pseudonym is stored and any previously-stored pseudonym is over-written in the subscriber identity module. If the received at least one temporary identity is at least one pseudonym and an appropriate data file to the store the at least one pseudonym is not available in the subscriber identity module, the at least one pseudonym is stored and any previously-stored pseudonym is over-written in the mobile equipment.

A temporary-identity-storage system includes means for receiving authentication challenge information and at least one temporary identity, means for processing the authentication challenge information, means for determining whether the processing results in successful authentication, means for considering the received at least one temporary identity to be valid responsive to a determination that the authentication was successful, means for storing the at least one pseudonym and over-writing any previously-stored pseudonym in a subscriber identity module if the received at least one temporary identity is at least one pseudonym and an appropriate data file to the store the at least one pseudonym is available in the subscriber identity module, and means for storing the at least one pseudonym and over-writing any previously-stored pseudonym in the mobile equipment if the received at least one temporary identity is at least one pseudonym and an appropriate data file to the store the at least one pseudonym is not available in the subscriber identity module.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein.

DETAILED DESCRIPTION OF EXEMPLARY EMBODIMENTS OF THE INVENTION

Figure 1:
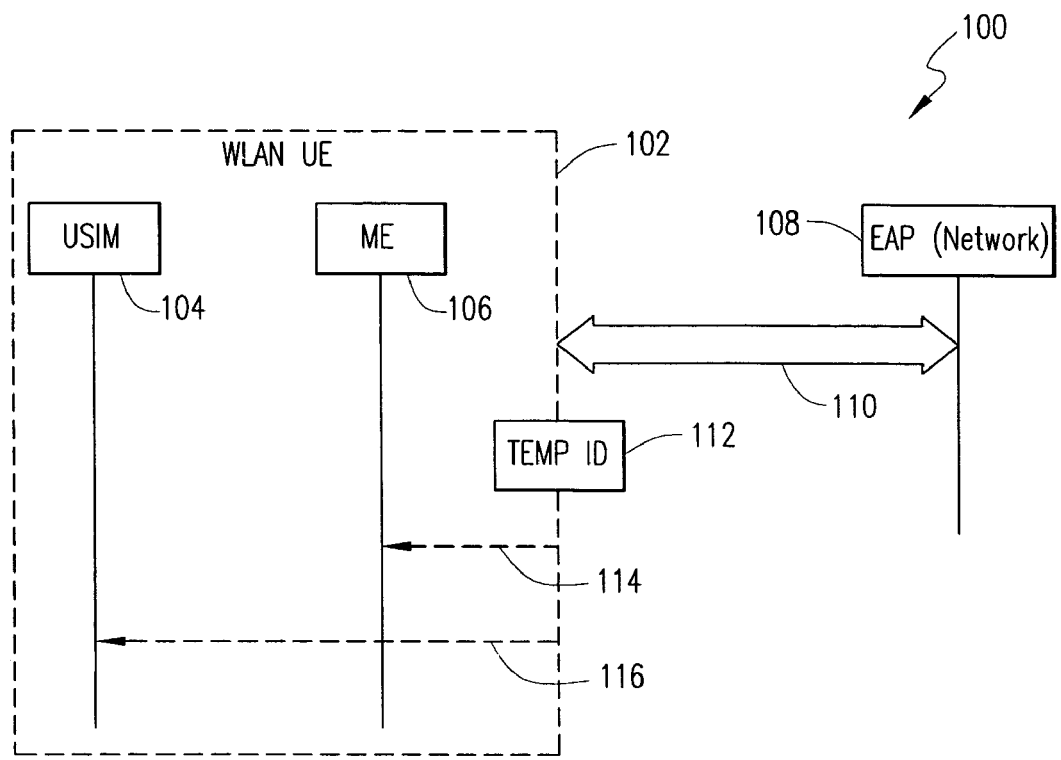
FIG. 1 is a messaging diagram illustrating a process in which temporary identities are received by user equipment.

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

A solution for storage of temporary identity/identities in the WLAN UE is needed in order to fulfill the I-WLAN requirements and make the 3GPP system inter-work with WLAN. In accordance with principles of the invention, upon receipt of any temporary identity, the WLAN UE processes Extensive Authentication Protocol (EAP) authentication challenge information received together with the temporary identity/identities. If the authentication challenge is successful, the WLAN UE considers the new temporary identity/identities as valid and the WLAN UE can take the following actions:

(1) If the received temporary identity is a pseudonym and an appropriate data file to store the pseudonym is available in the USIM, the WLAN UE stores the pseudonym in the USIM and overwrites any previously-stored pseudonym.

(2) If the received temporary identity is a pseudonym and an appropriate data file is not available in the USIM, the WLAN UE stores the pseudonym in the ME and over-writes any previously-stored pseudonym.

(3) If the received temporary identity is a re-authentication identity and an appropriate data file to store the re-authentication identity is available in the USIM, the WLAN UE stores the re-authentication identity in the USIM along with one or more security parameters (e.g., a new Master Key, Counter Value, and Transient EAP keys) and overwrites any previously-stored re-authentication identity and security parameters.

(4) If the received temporary identity is a re-authentication identity and an appropriate data file is not available in the USIM, the WLAN UE stores the re-authentication identity in the USIM together with the security parameters (e.g., new Master Key, Counter Value, and Transient EAP keys) in the ME.

The temporary identities are one-time identities. Therefore, if the WLAN UE does not receive a new temporary identity, the WLAN UE deletes the corresponding temporary identity/identities from the USIM/ME (e.g., the WLAN sets the username field to a "deleted" value to indicate that no valid re-authentication identity exists). When a username field of a temporary identity indicates the "deleted" value, the WLAN UE does not send that temporary identity at the next EAP authentication. The "delete" value is indicated by encoding all octets of the username part of the temporary identity with a hexadecimal value of FF. When the temporary identity username is coded with FF, this reserved value is used to indicate the special case in which no valid temporary identity exists in the WLAN UE. The network does not allocate a temporary identity when the whole username has been coded with the reserved hexadecimal value of FF.

FIG. 1 is a messaging diagram illustrating a process in which temporary identities are received by user equipment. A messaging diagram 100 illustrates communications between a WLAN user equipment (WLAN UE), which includes a USIM 104 and an ME 106, and an EAP (Network) 108. In the messaging diagram 100, upon completion of a successful EAP authentication exchange 110 between the WLAN UE 102 and the EAP (Network) 108, temporary identity/ies are received as indicated by box 112. Next, the temporary identity/ies are stored in the ME 106, as indicated by arrow 114. In addition, at the arrow 114, if a re-authentication identity has been received, security parameter(s) are stored in the ME 106. At arrow 116, the received temporary identity/ies are stored in the USIM 104. Also, at the arrow 116, if a re-authentication identity has been received, security parameters are stored in the USIM 104.

Figure 2:
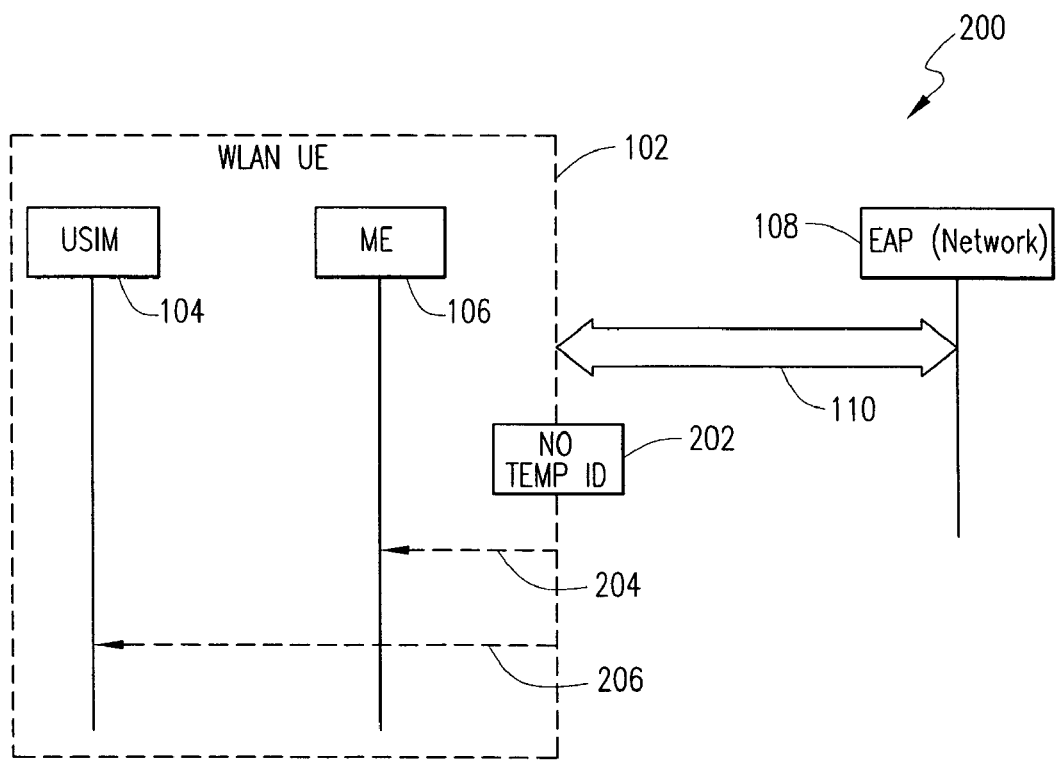
FIG. 2 is a messaging diagram illustrating a process in which temporary identities are not received by user equipment.

FIG. 2 is a messaging diagram illustrating a process in which temporary identities are not received by user equipment. In a messaging diagram 200, the WLAN UE 102 and the EAP (Network) 108 communicate in a similar fashion to that illustrated in the messaging diagram 100. Following the successful EAP authentication exchange 110, at block 202 no temporary identity/ies are received by the WLAN UE 102. Next, the ME 106 deletes any corresponding temporary identity/ies stored in the ME 106 as indicated by arrow 204. At arrow 206, the USIM 104 deletes any corresponding temporary identity/ies.

Figure 3:
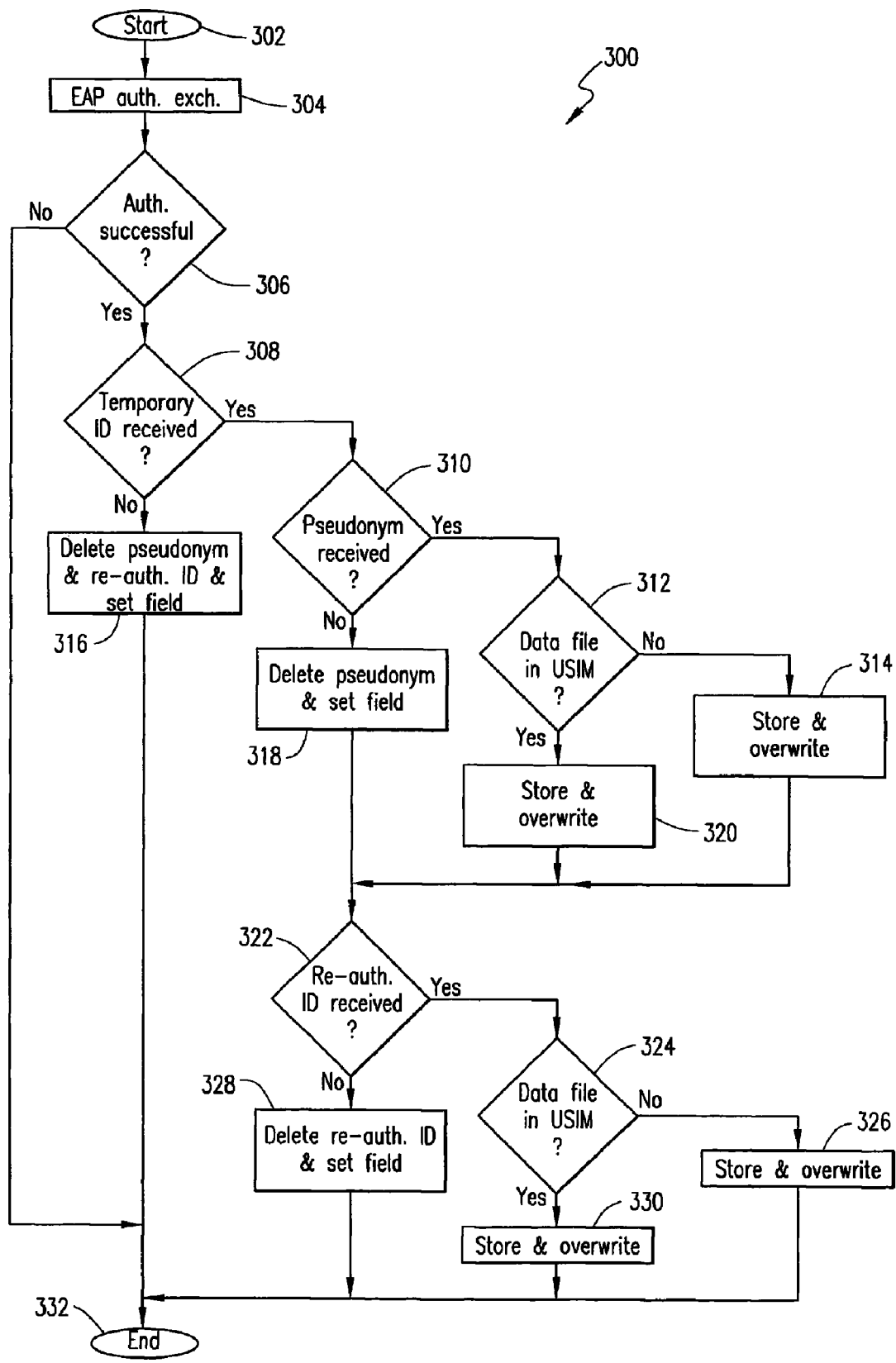
FIG. 3 is a flow diagram illustrating a temporary-identity storage process.

FIG. 3 is a flow diagram illustrating a temporary-identity storage process. A flow diagram 300 begins at step 302. From step 302, execution proceeds to step 304. At step 304, an EAP authentication exchange occurs. At step 306, a determination is made as to whether the EAP authentication exchange of step 304 was successful. If it is determined that the EAP authentication was not successful, execution proceeds to step 332, at which step execution ends. If, at step 306, it is determined that the authentication of step 304 was successful, execution proceeds to step 308.

At step 308, a determination is made as to whether any temporary identity was received. If it is so determined, execution proceeds to step 310. At step 310, a determination is made as to whether a pseudonym has been received. If it is so determined, execution proceeds to step 312. At step 312, a determination is made whether there is a data file to store the pseudonym in the USIM. If it is not so determined, execution proceeds to step 314. At step 314, the pseudonym is stored in the ME and any previously-stored pseudonym is overwritten.

Returning to step 308, if it is not determined that a temporary identity has been received, execution proceeds to step 316. At step 316, the pseudonym and any re-authentication identity are deleted from the USIM and the ME. In other words, the WLAN UE sets the user name field of the pseudonym and the re-authentication identity to a "deleted" value in order to indicate that no valid pseudonym/re-authentication identity exists. From step 310, if no pseudonym has been received, execution proceeds to step 318, at which step the pseudonym is deleted from the USIM or ME. In other words, at step 318, the WLAN sets the user name field to the "deleted" value to indicate that no valid pseudonym exists. From step 312, if it is determined that a data file to store the pseudonym is present in the USIM, execution proceeds to step 320, at which step the pseudonym is stored in the USIM and any previously-stored pseudonym is overwritten.

From each of steps 318, 320, and 314, execution proceeds to step 322. At step 322, a determination is made as to whether a re-authentication identity has been received. If it is so determined at step 322, execution proceeds to step 324. At step 324, a determination is made whether a data file to store a re-authentication identity is present in the USIM. If it is not so determined at step 324, execution proceeds to step 326. At step 326, the re-authentication identity, along with any security parameters, are stored in the ME and any previously-stored re-authentication identity and security parameters are overwritten. If, at step 322, it is not determined that a re-authentication identity has been received, execution proceeds to step 328. At step 328, the re-authentication identity is deleted from the USIM or ME. In other words, at step 328, the WLAN UE sets the user name field of the re-authentication identity to the "deleted" value to indicate that no valid re-authentication identity exists. If, at step 324, it is determined that a data file to store a re-authentication identity is present in the USIM, execution proceeds to step 330. At step 330, the re-authentication identity is stored, along with any security parameters, in the USIM and any previously stored re-authentication identity and security parameters are overwritten. From each of steps 316, 328, 330 and 326, execution proceeds to step 332. At step 332, execution ends.

Various embodiments of the invention serve to provide a solution for the storage of temporary identities for I-WLAN in the WLAN UE. Logic is used to indicate when a temporary identity is valid, as well as when the temporary identity is to be stored in the USIM or ME. A format of the "deleted" value, which indicates when no valid temporary identity exists in the WLAN UE, is also provided.

It should be emphasized that the terms "comprise/comprises/comprising" when used in this specification are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:

1. A method for storing a temporary-identity in a user equipment, the method comprising:
providing a mobile equipment with a subscriber identity module, the mobile equipment and the subscriber identity module in accordance with Third Generation Partnership Project (3GPP) standards;

receiving authentication challenge information and at least one temporary identity;

processing the authentication challenge information;

determining whether the processing step results in successful authentication; and responsive to a determination that the authentication was successful:

considering the received at least one temporary identity to be valid;

if the received at least one temporary identity is at least one pseudonym and an appropriate data file is available to store the at least one pseudonym in the subscriber identity module, storing the at least one pseudonym and over-writing any previously-stored pseudonym in the subscriber identity module; and if the received at least one temporary identity is at least one pseudonym and an appropriate data file is not available to store the at least one pseudonym in a subscriber identity module, storing the at least one pseudonym and over-writing any previously-stored pseudonym in the mobile equipment.

2. The temporary-identity-storage method of claim 1, further comprising, responsive to a determination that the authentication was successful:

if the received at least one temporary identity is at least one re-authentication identity and an appropriate data file to store the at least one re-authentication identity is available in the subscriber identity module, storing the at least one re-authentication identity along with at least one security parameter in the subscriber identity module; and if the received at least one temporary identity is at least one re-authentication identity and an appropriate data file to store the at least one re-authentication identity is not available in the subscriber identity module, storing the at least one re-authentication and the at least one security parameter in the mobile equipment.

3. The temporary-identity-storage method of claim 1, further comprising:

receiving authentication challenge information and no temporary identity; and responsive to the step of receiving the authentication challenge information and no temporary identity, deleting any previously-stored temporary identities in either of the subscriber identity module and the mobile equipment.

4. The temporary-identity-storage method of claim 3, wherein the step of deleting any previously-stored temporary identities comprises setting a username field to a deleted value.

5. The temporary-identity-storage method of claim 4, wherein the step of setting a username field to a deleted value comprises encoding all octets of a username part of the at least one temporary identity with a hexadecimal value of FF.

6. The temporary-identity-storage method of claim 4, wherein the hexadecimal value of FF indicates that no valid temporary identity exists.

7. The temporary-identity storage method of claim 1, wherein the at least one security parameter comprises at least one of:

a master key;

a counter value; and a transient Extensible Authentication Protocol (EAP) key.

8. A temporary-identity-storage system comprising:

a user equipment comprising a mobile equipment having a subscriber identity module, the mobile equipment and subscriber identity module in accordance with Third Generation Partnership Project (3GPP) standards;

means within the user equipment for receiving authentication challenge information and at least one temporary identity;

means within the user equipment for processing the authentication challenge information;

means within the user equipment for determining whether the processing results in successful authentication;

means within the user equipment for considering the received at least one temporary identity to be valid responsive to a determination that the authentication was successful;

means within the user equipment for storing the at least one pseudonym and over-writing any previously-stored pseudonym in a subscriber identity module if the received at least one temporary identity is at least one pseudonym and an appropriate data file is available to store the at least one pseudonym in the subscriber identity module; and means within the user equipment for storing the at least one pseudonym and over-writing any previously-stored pseudonym in the mobile equipment if the received at least one temporary identity is at least one pseudonym and an appropriate data file is not available to store the at least one pseudonym in the subscriber identity module.

9. The temporary-identity-storage system of claim 8, further comprising:

means for storing the at least one re-authentication identity along with at least one security parameter in the subscriber identity module if the received at least one temporary identity is at least one re-authentication identity and an appropriate data file to store the at least one re-authentication identity is available in the subscriber identity module; and means for storing the at least one re-authentication and the at least one security parameter in the mobile equipment if the received at least one temporary identity is at least one re-authentication identity and an appropriate data file to store the at least one re-authentication identity is not available in the subscriber identity module.

10. The temporary-identity-storage system of claim 8, further comprising:

means for receiving authentication challenge information and no temporary identity; and means for deleting any previously-stored temporary identities in either of the subscriber identity module and the mobile equipment.

11. The temporary-identity-storage system of claim 10, wherein the means for deleting any previously-stored temporary identities comprises means for setting a username field to a deleted value.

12. The temporary-identity-storage system of claim 11, wherein the means for setting a username field to a deleted value comprises means for encoding all octets of a username part of the at least one temporary identity with a hexadecimal value of FF.

13. The temporary-identity-storage system of claim 11, wherein the hexadecimal value of FF indicates that no valid temporary identity exists.

14. The temporary-identity storage system of claim 8, wherein the at least one security parameter comprises at least one of:

a master key;

a counter value; and a transient Extensible Authentication Protocol (EAP) key.

* * * * *

UNITED STATES PATENT AND TRADEMARK OFFICE
CERTIFICATE OF CORRECTION

| | | |
|---|---|---|
| PATENT NO. | : 7,836,305 B2 | Page 1 of 1 |
| APPLICATION NO. | : 11/080918 | |
| DATED | : November 16, 2010 | |
| INVENTOR(S) | : Veron | |

It is certified that error appears in the above-identified patent and that said Letters Patent is hereby corrected as shown below:

On the Title Page, item (57), under "ABSTRACT", in Column 2, Line 11, delete "to the store" and insert -- to store --, therefor.

On the Title Page, item (57), under "ABSTRACT", in Column 2, Line 16, delete "to the store" and insert -- to store --, therefor.

On the Title Page, item (57), under "ABSTRACT", in Column 2, Lines 19-24, delete "This Abstract ........................meaning of the claims. 37 CFR 1.72(b).".

In Column 1, Line 8, delete "of," and insert -- of --, therefor.

In Column 1, Line 54, delete "to the store" and insert -- to store --, therefor.

In Column 1, Line 59, delete "to the store" and insert -- to store --, therefor.

In Column 2, Line 7, delete "to the store" and insert -- to store --, therefor.

In Column 2, Line 12, delete "to the store" and insert -- to store --, therefor.

Signed and Sealed this
Twenty-fifth Day of January, 2011

David J. Kappos
*Director of the United States Patent and Trademark Office*